Feb. 13, 1962  J. G. SAGE  3,020,628
APPARATUS FOR DISASSEMBLING TOP ROLL BEARING RIDERS
Filed April 11, 1958  2 Sheets-Sheet 1

INVENTOR
JOHN G. SAGE
By Donald G. Dalton
Attorney

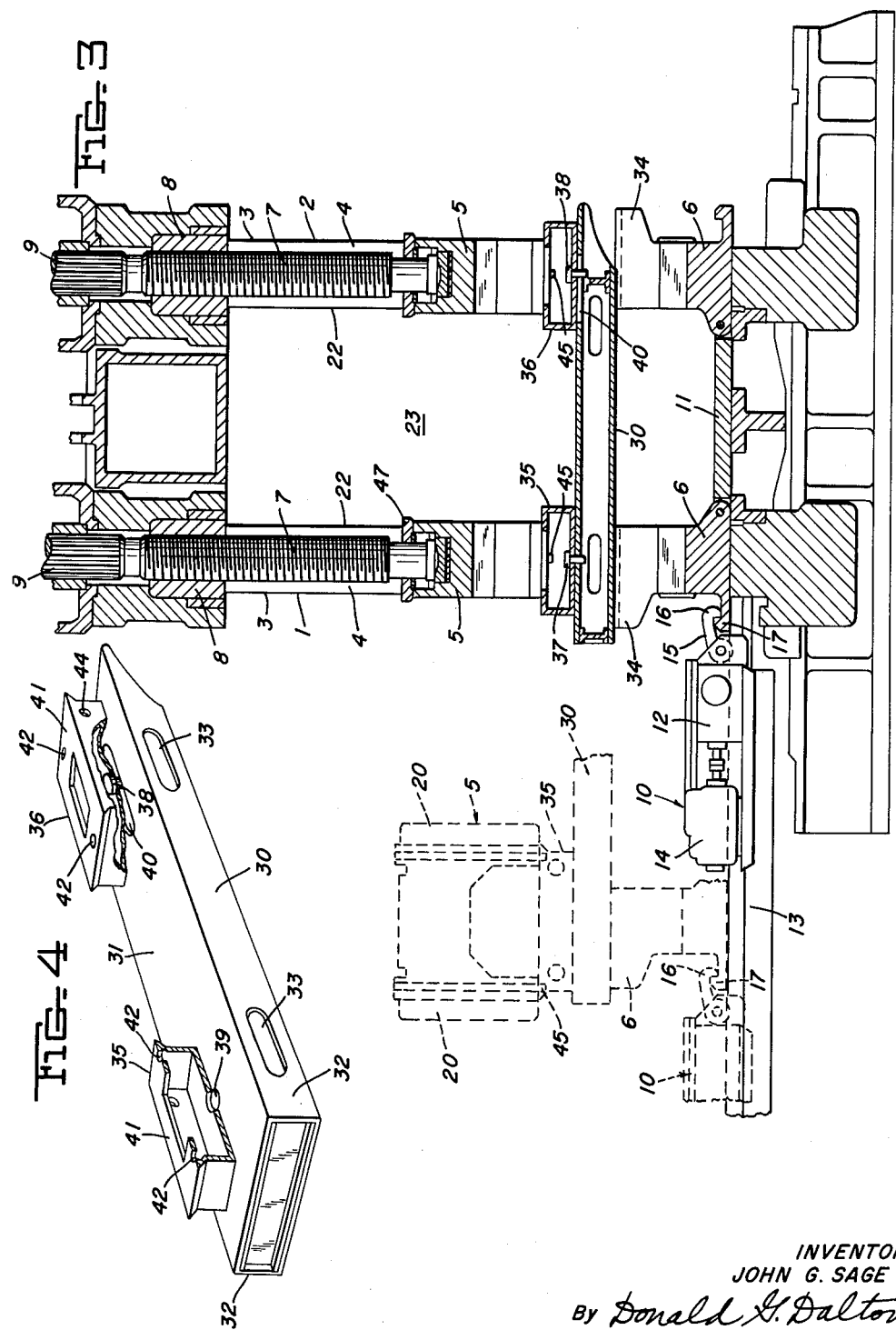

United States Patent Office 3,020,628
Patented Feb. 13, 1962

1

3,020,628
APPARATUS FOR DISASSEMBLING TOP ROLL BEARING RIDERS
John G. Sage, East McKeesport, Pa., assignor to United States Steel Corporation, a corporation of New Jersey
Filed Apr. 11, 1958, Ser. No. 727,954
3 Claims. (Cl. 29—200)

This invention relates to apparatus for use in the maintenance and repair of slabbing mills and is directed, more particularly, to the problem of removing and replacing top roll bearing chocks in a two-high universal slabbing mill.

The bearing chocks, which support the top and bottom works rolls of a slabbing mill, are respectively comprised of an upper part or rider that is positioned over the upper half of a roll-neck bearing, and a lower part or carrier that is arranged under the lower half of such bearing and has a bolted connection with the rider. They are mounted in roll housing windows at opposite edges of the mill and must be removed and replaced with respect thereto when a roll change or bearing repairs are needed. With the exception of the riders for the top roll, this is effected readily by a roll changing rig that operates to slide the rolls and their bearings as an assembled unit in an axial direction through one of the housing windows.

Removal and replacement of the top roll riders require separate operations, which must be performed after removal of the work rolls and the other parts of their bearing supports, to condition them for movement through the housing windows. This is due to the fact that the top roll riders act as thrust bearings for the top roll and, for this purpose, have side flanges which transmit roll end thrust to the roll housings at opposite sides of the windows therein. Such side flanges, being wider than the roll housing windows, prevent movement of the riders therethrough and require that they be first rotated to positions in which their flanges clear the inner edges of the windows. According to conventional practice this is accomplished by suspending the riders from the mill crane by cables so that they may be moved from the housing windows into the space between the housings and then lowered and rotated through an angle of 90° to a position in which their thrust transmitting flanges can be moved through the roll housing windows. Manipulation of the top roll bearing riders in this manner involves operations that are difficult and dangerous since they must be performed by millwrights working under adverse conditions, from the standpoint of excessive dirt, grease and heat, and poor lighting, in locations where they are hidden by the mill housings and screwdown and cannot be seen by the crane operator. The adverse nature of these operations will be better appreciated when consideration is given to the fact that each top bearing rider is a huge casting that has a close fit for vertical sliding movement in a housing window and that has, for example, in a typical 44" slab mill, a dimension of over five feet between its thrust transmitting end flanges and a weight in excess of 13,000 pounds. In addition conventional practice requires as much as 12–16 hours for removal of the top bearing riders and prevents the use of the mill crane for other work during the entire period in which such removal is being performed.

One of the principal objects of this invention is to provide an apparatus that will enable the removal and replacement of top bearing riders without danger to millwrights performing the operation.

Another object is to provide an apparatus that will shorten the time required for removal of the riders of both top roll bearing chocks to a period of approximately one hour, and will eliminate the need for using the mill crane for the removal and replacement of top roll bearing riders.

To the accomplishment of these and related ends, the apparatus of this invention contemplates an auxiliary supporting frame that is used in conjunction with the conventional roll changing rig and is placed astraddle the upper ends of the bottom roll bearing carriers for movement by the roll changing rig through the roll housing windows. Two turntables on the supporting frame furnish rotatable supports on which the top roll bearing riders are received when lowered by operation of the mill screwdown mechanism. After lowering and supporting in this manner, the riders are turned by rotation of the turntables to positions in which they can be moved through the roll housing windows by the roll changing rig. In this respect it will be understood that the roll changing rig and the bottom roll bearing carriers actuated thereby are a part of the apparatus of this invention in that they are elements in the combination that includes the auxiliary supporting frame and turntables thereon.

Other objects and advantages of the invention will become apparent from the following description.

In the drawings, there is shown a preferred embodiment of the invention. In this showing:

FIGURE 3 is a sectional view taken transversely of a slabbing mill and substantially in the plane of line III—III of FIGURE 1, showing the manner in which the supporting frame and turntables of this invention operate to provide supports for the top roll riders;

FIGURE 4 is a perspective view, with parts thereof broken away and shown in section, of the turntable supporting frame shown in FIGURES 1 and 3.

Figure 1:
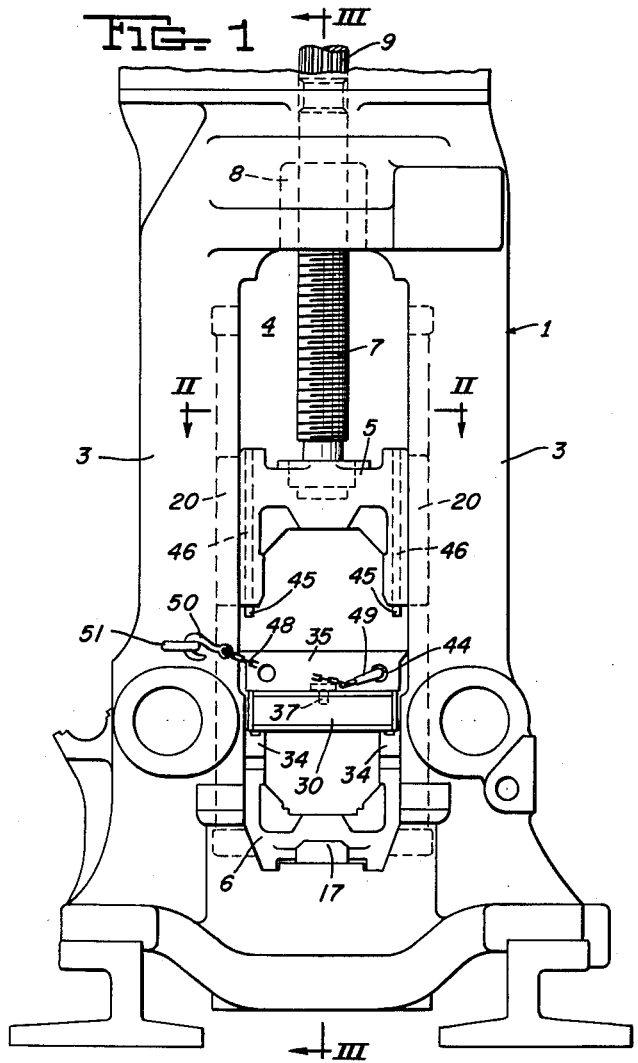
FIGURE 1 is a fragmentary view, looking from one side of a slabbing mill, which shows the apparatus of this invention in end elevation and its arrangement in the windows of a roll housing.

The drawings show the roll housings 1 and 2 of a two-high universal slabbing mill after removal therefrom of its top and bottom work rolls together with their roll-neck bearings, the rider of the bottom roll bearing chock, and the carrier of the top roll bearing chock. As shown in FIGURE 1, each of the housings 1 and 2 has a pair of vertically extending posts 3 that define the edges of a window 4 in which the bearing chocks of the work rolls have a slide fit for guided vertical movement therein. Only the riders 5 of the top roll bearing chocks, and the carriers 6 of the bottom roll bearing chocks have been shown in the drawings; the rolls and the remaining parts of their bearing chocks having been removed as indicated above.

The riders 5 of the top roll bearing chocks are connected for operation by screws 7 which have threaded engagement in nuts 8 and splined extensions 9 at their upper ends that are effective upon rotation by the drive (not shown) of the mill screwdown to impart vertical movement to the riders 5. Vertical adjustment of the riders 5 in this manner is effective during operation of the mill to position the top work roll with respect to the bottom work roll for a proper rolling operation.

The carriers 6 of the bearing chocks for the bottom roll are supported for sliding movement to the left as viewed in FIGURE 3 by a roll changing rig 10, and are connected for simultaneous movement by a connecting link 11 so that they form a slide carriage for moving the rolls and other mill parts through the windows 4. The rig 10 comprises carriage 12 that is mounted for horizontal sliding movement over a supporting track 13 and has an electric motor drive 14 for sliding it back and forth. Connection of the carriers 6 for movement by the carriage 12 is provided by a pivoted link 15 that has a hook 16 at its outer end for engagement over a hook 17 on the adjacent carrier 6.

Figure 2:
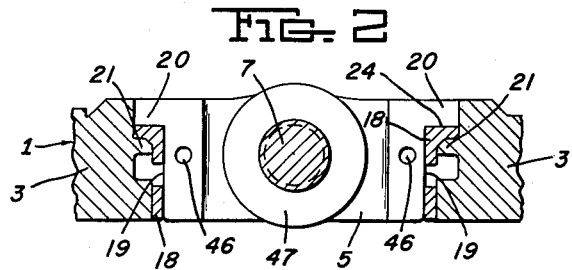
FIGURE 2 is a sectional view taken substantially along the line II—II of FIGURE 1.

As best shown in FIGURE 2, the vertical posts 3 have liner plates 18 along their facing edges that define the outer edges of the windows 4 and have sliding engagement with opposite sides 19 of the riders 5 to guide their vertical movement in the windows 4. Flanges 20 extending in opposite directions from the sides 19 engage ledges 21 and thus operate to transmit end thrust to the posts 3. The flanges 20 on each of the riders 5 are arranged along the inner edges 22 (see FIGURE 3) of the housings 1 and 2 and in such manner that they can be moved inwardly toward each other into the space 23 between the housings 1 and 2, but restrain their movement outwardly in directions away from each other. In this manner, the riders 5 are effective to transmit end thrust on the top roll to the housings 1 and 2 but cannot be removed readily from the housings 1 and 2.

The above described arrangement of bearing riders 5, carriers 6 and roll changing rig 10 is conventional and forms no part per se of the invention. In accordance with conventional practice, removal of the riders 5 requires their elevation by the screws 7 to positions in which the rolls and other bearing parts supported on the carriers 6 can be withdrawn through the window 4 of the housing 1 by operation of the rig 10. The riders 5 are then supported from the mill crane by cables so that the screws 7 may be disengaged therefrom to permit their removal. Each of the riders 5, while suspended from cables in this manner, must be then moved into the space 23 between the roll housings and then rotated to positions in which they can be moved through one of the windows 4 without interference from their thrust transmitting flanges 20. The operations required for this purpose are tedious and time consuming. In addition they must be performed by men working in the space 23 and alongside the roll housings where they cannot be seen by the operator of the mill crane. The performance of these operations thus subjects the millwrights to dangerous operating conditions which are eliminated by this invention in a manner to be described.

The apparatus of this invention comprises a supporting frame 30 fabricated from steel plate by welding that has a rectangular shape and a length somewhat greater than the distance between the carriers 6. It has a top plate 31 and side plates 32 with openings 33 therein by which it can be supported and lowered to a position resting on the upper ends of the sides 34 of the bearing carriers 6 as shown in FIGURES 1 and 3. A pair of turntables 35 and 36 are supported on the frame 30 in positions that are spaced apart a distance corresponding to the spacing of the riders 5 in the housings 1 and 2. Vertical pivot pins 37 and 38 extending through openings 39 and 40 in the frame top 31 provide for rotational movement of the turntables 35 and 36. The opening 40 is a slot extending lengthwise of the frame 30 to provide for lengthwise movement of the pivot pin 38 and turntable 36 with respect to the frame 30 for a purpose to be described. The top 41 of each turntable 35 and 36 has openings 42 at opposite ends thereof, and their side plates 43 have openings 44 for a purpose to be described.

In operation the rig 10 is used in its intended manner to slide the bottom roll bearing carriers 6 with the mill rolls and their bearing parts supported thereon through the window 4 in the housing 1 to an accessible position on the mill floor where they can be removed by the mill crane. After removal of the work rolls and their bearing chocks in this manner, the frame 30 with the turntables 35 and 36 of this invention thereon is lowered to a position straddling the space between the carriers 6 and supported on the upper ends of the legs 34 as described above. The roll changing rig is then operated to slide the carriers 6 through the window 4 of the housing 1 to the position shown in FIGURE 3 of the drawings, so that the screws 7 can be operated to lower the riders 5 from the position shown in FIGURE 1 to the position shown in FIGURE 3 in which they are supported on the turntables 35 and 36. Prior to lowering the riders 5 to positions supported on the turntables, locking pins 45 are lowered through vertically extending openings 46 which normally receive the bolts used to fasten the bearing rider in each bearing chock to its bottom half or carrier. The spacing of the openings 42 in the turntable tops 41 corresponds to the spacing of the pins 45 that are received therein and thus lock the riders 5 against movement relative to the turntables 35 and 36 on which they are supported. The screws 7 are then disconnected from the riders 5 by detaching their connecting caps 47 and operating the screwdown to elevate the screws 7 to positions in which their lower ends are above the riders 5. This completes the operations necessary to place the riders 5 in condition for their being turned through an angle of 90° so that they can be removed by operation of the roll changing rig 10.

The rig 10 is then operated to move the carriers 6 and frame 30 to the right as viewed in FIGURE 3 and to move the rider 5 supported on the turntable 35 to a position in the space 23 in which its sides 19 are disengaged from the liner plates 18 that define the sides of the window 4 of the housing 1. During this movement, the thrust flanges 20 on the other rider 5 at the drive side of the mill prevent its movement with the frame 30 and cause the turntable 36 on which it is mounted and the pivot pin 38 to slide in a lengthwise direction over the top 31 of the frame 30, this movement being permitted by the elongated slot 40 in which the pin 38 is received. An anchoring chain 48 is then attached to the turntable 35 by engaging a hook 49 at one end thereof in one of the side openings 44 and a hook 50 at its other end in an eyelet or other suitable connection fastened to the housing 1. The attachment of the chain 48 in this manner may precede movement of the frame 30 to move the rider 5 into the space 23 but, in such case, it must have a length sufficient to permit movement of the turntable 35 into the space 23 before imparting turning movement thereto. Upon further movement of the platform 30 to the right as viewed in FIGURE 3, slack in the anchoring chain 48 is taken up, and continued movement of the frame 30 is effective to rotate the turntable 35 about its pivot pin 37. When such rotation has moved the turntable through an angle of 90°, the chain 48 is disconnected and the rig 10 is operated to move the platform 30 to the left as viewed in FIGURE 3. As soon as the turntable 36 moves to a position in which the rider 5 carried thereby has moved into the space 23 and is clear of the sides of the window 4 in the housing 2, an anchoring chain 48 is hooked into one of its side openings 44 and to the housing 2 as explained above in connection with turntable 35. Thereafter, continued movement of the frame 30 to the left as viewed in FIGURE 3 will operate to turn the table 36 through an angle of 90°, after which the anchoring chain 48 for the turntable 36 is disengaged to release it for removal with the platform 30. At this point both of the turntables 35 and 36 have been rotated through an angle of 90°, and the riders 5 supported thereon are thus in positions in which they can be moved through the housing window 4 in the housing 1 without interference from their thrust flanges 20. Continued movement of the frame 30 to the left by the rig 10 is thus effective to move the frame 30 through the window 4 to the position indicated in broken lines and to remove it and the riders supported thereby from the space 23 between the housings 1 and 2.

Replacement of the riders 5 in the housings 1 and 2 is readily effected by performing the operations described above in reverse order.

From the foregoing it will be apparent that the apparatus of this invention, which is comprised of the frame 30 and the turntables 35 and 36 rotatably supported thereon, in conjunction with the conventional arrangement of bearing carriers 6 and their sliding support for movement by the roll changing rig 10, enables movement and replacement of the riders 5 without the necessity of using the mill crane. In this manner, the invention renders the mill crane available for other work in the mill during the entire period during which removal and replacement of the riders 5 is being performed. In addition it enables the operation to be performed in a much shorter period of time compared to conventional practice; removal of the riders 5 being effected, as indicated above, in a period of about 1 hour compared to the 12 to 16 hours required by conventional practices.

Attention is particularly directed to the fact that the riders 5 are positively supported by the turntables 35 and 36 at all times during their removal and replacement with respect to the housings 1 and 2. By reason of the support thus provided by the turntables 35 and 36 it will be further apparent that handling of the riders 5, as an incident to a roll change or bearing repair, is performed more safely than is possible under conventional practices.

While one embodiment of my invention has been shown and described it will be apparent that other adaptations and modifications may be made without departing from the scope of the following claims.

I claim:

1. An apparatus for removing top roll bearing riders from bearing chock windows in a pair of laterally spaced rolling mill roll housings comprising, in combination, a roll changing slide carriage mounted for movement over a horizontal path extending through said windows and including a spaced pair of bearing carriers forming part of the bearing chocks for a bottom roll, a frame spanning the distance between said carriers and having supporting engagement thereon, a pair of turntables mounted for rotation on said frame about vertical axes spaced apart a distance corresponding to the spacing of said top roll bearing riders, and means comprising the mill screw-down jack-posts for lowering said riders onto said turntables for rotation thereby to positions in which they can be moved by said slides through said windows.

2. An apparatus as defined in claim 1 characterized by the mounting for said turntables comprising a pair of pivot pins, and by said frame having openings in which said pins are rotatably supported, one of said openings being a slot extending in the direction of said path of slide movement to provide for movement of said turntables toward and away from each other.

3. An apparatus as defined in claim 1 characterized by the provision of means for rotating said turntables in response to movement of said slide carriage comprising a link having a stationary anchoring connection at one end and a detachable connector at its other end for connection with a selected one of said turntables to be rotated at a point spaced radially from its said vertical axis of rotation.

References Cited in the file of this patent

UNITED STATES PATENTS

| | | |
|---|---|---|
| 754,530 | Zilker | Mar. 15, 1904 |
| 1,407,003 | Smith | Feb. 21, 1922 |
| 2,171,282 | Wochner | Aug. 29, 1939 |
| 2,512,574 | Carson | June 20, 1950 |
| 2,672,663 | Whitehouse | Mar. 23, 1954 |